United States Patent
Cha et al.

(10) Patent No.: US 9,030,534 B2
(45) Date of Patent: May 12, 2015

(54) APPARATUS AND METHOD OF DISPLAYING 3-DIMENSIONAL IMAGE

(75) Inventors: Hongrae Cha, Seoul (KR); Taesoo Park, Seoul (KR); Jaekwang Lee, Yongin-si (KR)

(73) Assignee: LG Electronics Inc., Seoul (KR)

( * ) Notice: Subject to any disclaimer, the term of this patent is extended or adjusted under 35 U.S.C. 154(b) by 209 days.

(21) Appl. No.: 13/209,561

(22) Filed: Aug. 15, 2011

(65) Prior Publication Data

US 2012/0038634 A1   Feb. 16, 2012

(30) Foreign Application Priority Data

Aug. 16, 2010 (KR) .................. 10-2010-0078739

(51) Int. Cl.
*G06T 15/00*   (2011.01)
*H04N 13/04*   (2006.01)

(52) U.S. Cl.
CPC ....... *H04N 13/0404* (2013.01); *H04N 13/0409* (2013.01); *H04N 13/0468* (2013.01)

(58) Field of Classification Search
CPC ..... H04N 135/04; H04N 5/66; H04N 5/7441; H04N 5/7491; H04N 9/30; G06T 15/00
USPC ............ 345/6, 156, 419; 348/46, 79, 121, 51, 348/58
See application file for complete search history.

(56) References Cited

U.S. PATENT DOCUMENTS

| | | | | |
|---|---|---|---|---|
| 5,822,117 A | | 10/1998 | Kleinberger et al. | ......... 359/465 |
| 6,040,807 A | * | 3/2000 | Hamagishi et al. | ............... 345/6 |
| 6,049,424 A | | 4/2000 | Hamagishi | .................... 359/464 |
| 6,831,678 B1 | * | 12/2004 | Travis | .............................. 348/46 |
| 2005/0264558 A1 | * | 12/2005 | Vesely et al. | .................. 345/419 |
| 2006/0012542 A1 | * | 1/2006 | Alden | ............................. 345/32 |
| 2006/0119572 A1 | * | 6/2006 | Lanier | ........................... 345/156 |

(Continued)

FOREIGN PATENT DOCUMENTS

CN    1512456 A    7/2004
CN    1976483 A    6/2007

(Continued)

OTHER PUBLICATIONS

European Search Report dated Apr. 18, 2013 issued in Application No. 11 00 6554.7.

(Continued)

*Primary Examiner* — Y Lee
*Assistant Examiner* — Salame Amr
(74) *Attorney, Agent, or Firm* — KED & Associates, LLP

(57) ABSTRACT

An apparatus and a method of displaying 3-Dimensional image are disclosed. A camera unit serves to capture an image of a viewer. A position tracking device serves to detect a position of the viewer using a video frame included in the captured image and calculate a position of a non-transmissive region of a 3D image filter based on the detected position of the viewer. A display unit serves to move the non-transmissive region of the 3D image filter according to the calculated position of the non-transmissive region. Changing a sweet spot of the 3D image to suit movement of the viewer has the effects of enlarge a viewing angle of the viewer and preventing crosstalk and image flipping even when the viewer moves.

15 Claims, 14 Drawing Sheets

(56) References Cited

U.S. PATENT DOCUMENTS

| | | | |
|---|---|---|---|
| 2009/0152664 A1* | 6/2009 | Klem et al. | 257/440 |
| 2010/0060983 A1 | 3/2010 | Wu et al. | 359/466 |
| 2010/0231706 A1* | 9/2010 | Maguire, Jr. | 348/121 |
| 2010/0259605 A1* | 10/2010 | So et al. | 348/79 |

FOREIGN PATENT DOCUMENTS

| | | |
|---|---|---|
| CN | 101341763 A | 1/2009 |
| EP | 1 816 510 A1 | 8/2007 |

OTHER PUBLICATIONS

Chinese Office Action dated Jan. 10, 2014 issued in Application No. 201110300199.6 (with English translation).

Chinese Office Action issued in related application No. 20110300199.6 dated Jun. 10, 2014.

Chinese Search Report issued in application No. 20110300199.6 dated May 28, 2014.

Chinese Office Action issued in application No. 201110300199.6 dated Oct. 31, 2014. (Office Action and English Translation).

* cited by examiner

APPARATUS AND METHOD OF DISPLAYING 3-DIMENSIONAL IMAGE

CROSS-REFERENCE TO RELATED APPLICATION

Pursuant to 35 U.S.C. §119(a), this application claims priority to Korean Application No. 10-2010-0078739, filed on, Aug. 16, 2010 whose entire disclosures are incorporated herein by reference.

FIELD

One or more embodiments described herein relate to the processing of 3-dimensional images for presentation on a display apparatus.

BACKGROUND

In recent years, display technology for representing 3-Dimensional (3D) images has been studied and utilized in a variety of fields. In particular, with use of technology for displaying 3D images, electronic devices for displaying 3D are a focus of attention.

Display of 3D images is based on binocular disparity. Methods for displaying 3D images using binocular disparity may be classified into a shutter glass method, a holographic method and an auto-stereoscopic method. The shutter glass method has a drawback in that a user must wear additional equipment, such as polarizing glasses, and the holographic method has a drawback in that a user can view a 3D image only from a particular position. Due to these drawbacks of the shutter glass method and the holography method, the auto-stereoscopic method has been actively studied recently.

BRIEF DESCRIPTION OF THE DRAWINGS

Arrangement and embodiments may be described in detail with reference to the following drawings in which like reference numerals refer to like elements and wherein.

DETAILED DESCRIPTION

Reference will now be made in detail to arrangements and embodiments, examples of which are illustrated in the accompanying drawings. Wherever possible, the same reference numbers will be used throughout the drawings to refer to the same or like parts. The detailed description explains exemplary arrangements and embodiments, rather than to show the only embodiments that can be implemented. In the following description, a detailed description of known functions and configurations incorporated herein may be omitted when it may make the subject matter unclear.

Terms as disclosed herein may be defined carefully and may correspond to general terms well known in the art, and may be differently determined according to intention of those skilled in the art, usual practices, and/or introduction of new technologies. A few terms may have been selected by the applicant as necessary and may hereinafter be disclosed in the following description. Operations of a digital broadcast receiver and a method for providing a graphical user interface may hereinafter be described with reference to the accompanying drawings.

Figure 1:
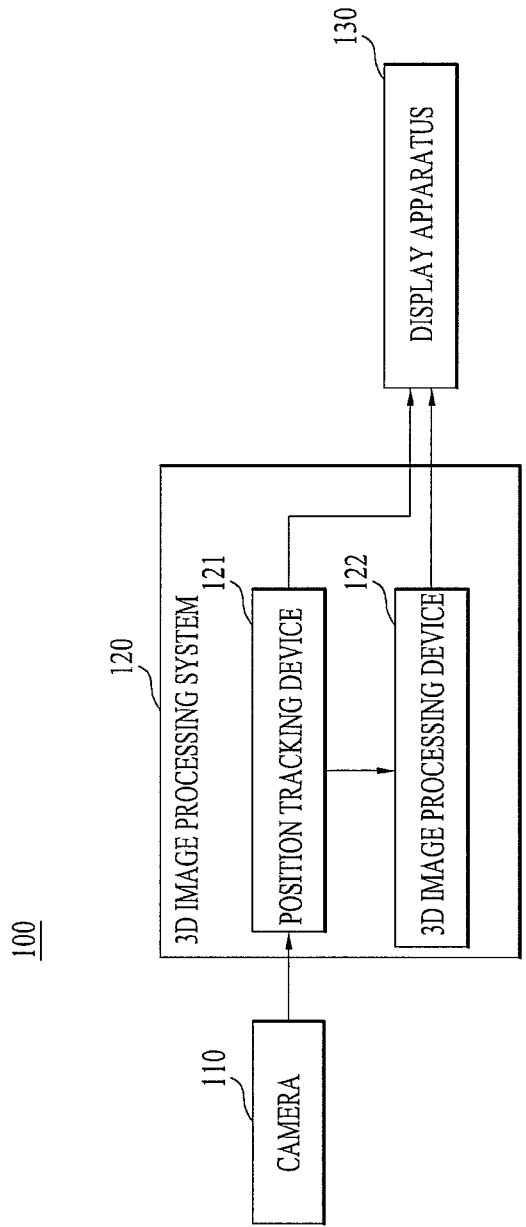
FIG. 1 is a block diagram illustrating a configuration of an exemplary embodiment of a 3D image display system.

FIG. 1 is a block diagram illustrating a configuration of an exemplary embodiment of a 3D image display system.

Referring to FIG. 1, the 3D image display system 100 in accordance with the exemplary embodiment may include a camera 110, a 3D image processing system 120 and a display apparatus 130. The 3D image display system 100 may be a personal computer, such as a desktop computer, a laptop computer, a tablet, or a handheld computer. The 3D image display system may also be a mobile terminal, such as a cellular phone, a smart phone, a Digital Multimedia Broadcasting (DMB) terminal, a Personal Digital Assistant (PDA), a Portable Multimedia Player (PMP), or a navigator, and may be a fixed electric appliance such as a digital TV.

The camera 110 captures an image of a viewer. The camera 110 may operate at a variety of frame rates and is configured to output a video frame, obtained by capturing an image of the viewer, to the 3D image processing system 120 according to a preset or given frame rate. If the camera 110 is set to 25 Hz, the camera 110 may capture 25 frames per second to output the video frames to the 3D image processing system 120.

The 3D image processing system 120 may detect a position of the viewer via the video frames output from the camera 110 and may control display of a 3D image based on the detected position. The 3D image processing system 120 may estimate a position of the viewer after a predetermined time passes via the output video frames and may control display of a 3D image based on the estimated position. The 3D image processing system 120 may include a position tracking device 121 and a 3D image processing device 122. The 3D image processing system 120 may take the form of a single product. In one example, the 3D image processing system 120 may take the form of a set-top box.

The position tracking device 121 receives the video frames, obtained by capturing an image of the viewer, from the camera 110 and detects a position of the viewer using the received video frames. The position tracking device 121 may calculate a position of a 3D image filter based on the detected position of the viewer. The position of the 3D image filter may be a position of a barrier or a position of a lens.

The position tracking device 121 may calculate a displacement of the 3D image filter by calculating a difference between the calculated position of the 3D image filter and a current position of the 3D image filter. The displacement of the 3D image filter may be a displacement of a barrier or a displacement of a lens.

The position tracking device 121 may calculate a movement speed of the viewer using at least one of the detected position of the viewer and previously detected positions of the viewer. The position tracking device 121 may estimate a position of the viewer when a preset time passes using the detected position of the viewer and the calculated movement speed of the viewer, and may calculate a position and displacement of the 3D image filter based on the estimated position of the viewer.

The position tracking device 121 may be a single module. The modular position tracking device 121 may be inserted into the 3D image processing device 122 and be manufactured as a single product. The 3D image processing system 100 may execute a program for performing a function of the position tracking device 121 under control of a controller and thus, may function as the position tracking device 121.

The 3D image processing device 122 may produce a control signal for requesting movement of the 3D image filter, based on the position and displacement of the 3D image filter calculated by the position tracking device 121, to output the control signal to the display apparatus 130. The 3D image processing device 122 may be a broadcast receiver for encoding a received 3D image signal or a stored 3D image file. The broadcast receiver may be configured to receive a broadcast service transmitted through a terrestrial broadcast system, a satellite, a cable and the Internet.

The broadcast receiver may be configured to provide the viewer with an Internet service. The Internet service includes a Content on Demand (CoD) service, a YouTube service, an information service for providing weather, news and local information and enabling information retrieval and the like, an entertainment service related to gaming, singing and the like, a communication service related to TV mail and TV Short Message Service (SMS) and the like, which may be provided through the Internet. Thus, in the present embodiment, the broadcast receiver includes a network TV, a Web TV and a broadband TV.

The broadcast receiver may also be a smart TV, which may receive, install and execute an application service transmitted from a server through a network.

In addition to a broadcast service transmitted through a terrestrial broadcast system, a satellite and a cable, the 3D image processing device 122 may receive an Internet service. The broadcast service may provide a 3D image as well as a 2D image. The 3D image may be a multi-view image. The multi-view image refers to a multiplicity of images obtained by capturing an image of a single subject using a plurality of cameras, which are kept at predetermined distances or angles with respect to the subject. An image obtained by each camera is referred to as a view image.

The display apparatus 130 displays a 3D image under control of the 3D image processing system 120. The display apparatus 130 may be a barrier type shutter glass 3D display or a lenticular type shutter glass 3D display, which are configured to display a 2D image or 3D image. The display apparatus 130 may be manufactured as an independent product, or may be integrated with the 3D image processing system 120 or the 3D image processing device 122. The display apparatus 130 may be a shutter glass 3D display having a view format in a sub-pixel or pixel unit.

Figure 2:
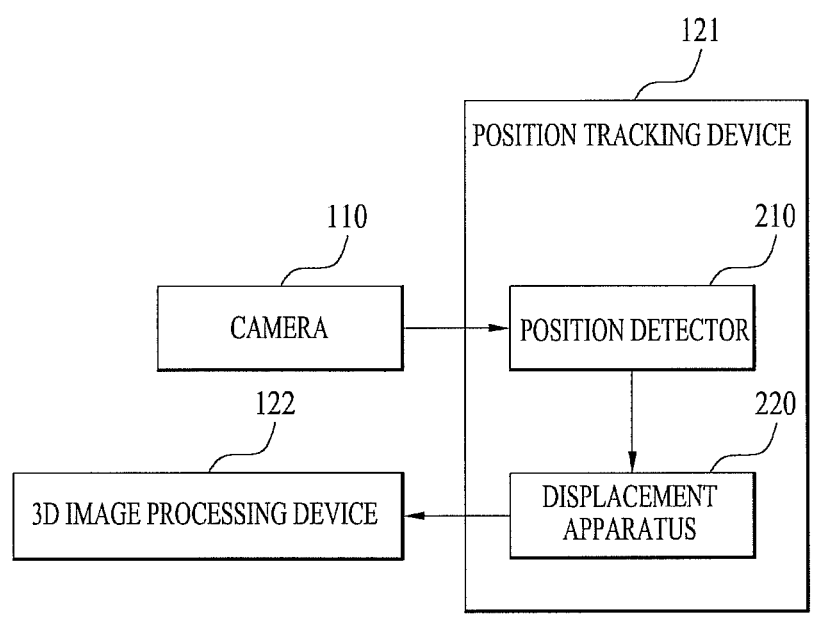
FIG. 2 is a block diagram illustrating a configuration of an exemplary embodiment of a position tracking device.

FIG. 2 is a block diagram illustrating a configuration of an exemplary embodiment of the position tracking device.

Referring to FIG. 2, the position tracking device 121 may include a position detector 210 and a displacement calculator 220. The position detector 210 receives a video frame, obtained by capturing an image of the viewer, and detects a position of the viewer using the received video frame. The position detector 210 may detect the position of the viewer by recognizing a face area. The position detector 210 may recognize the face area based on an algorithm using the symmetry of a face, an algorithm using hair color and face color and an algorithm using the profile of a face. The position detector 210 may also recognize a face area by extracting skin color information from the video frame.

The displacement calculator 220 calculates a position and displacement of the 3D image filter based on the detected position of the viewer and outputs the calculated displacement of the 3D image filter. The displacement calculator 220 may calculate the displacement of the 3D image filter by searching for positions of a transmissive region and a non-transmissive region of the 3D image filter having a sweet spot corresponding to the detected position of the viewer and calculating a difference between the located positions and current positions of the transmissive region and the non-transmissive region of the 3D image filter. The transmissive region refers to a region of the 3D image filter which passes light, and the non-transmissive region refers to a region of the 3D image filter which does not pass light. The non-transmissive region may be a region occupied by a barrier.

In some embodiments, the displacement calculator 220 may calculate a position and displacement of a lens based on the detected position of the viewer, to output the calculated lens position and lens displacement. The calculated lens position and lens displacement may be output to the 3D image processing device 122 and also, be output to the display apparatus 130.

Figure 3:
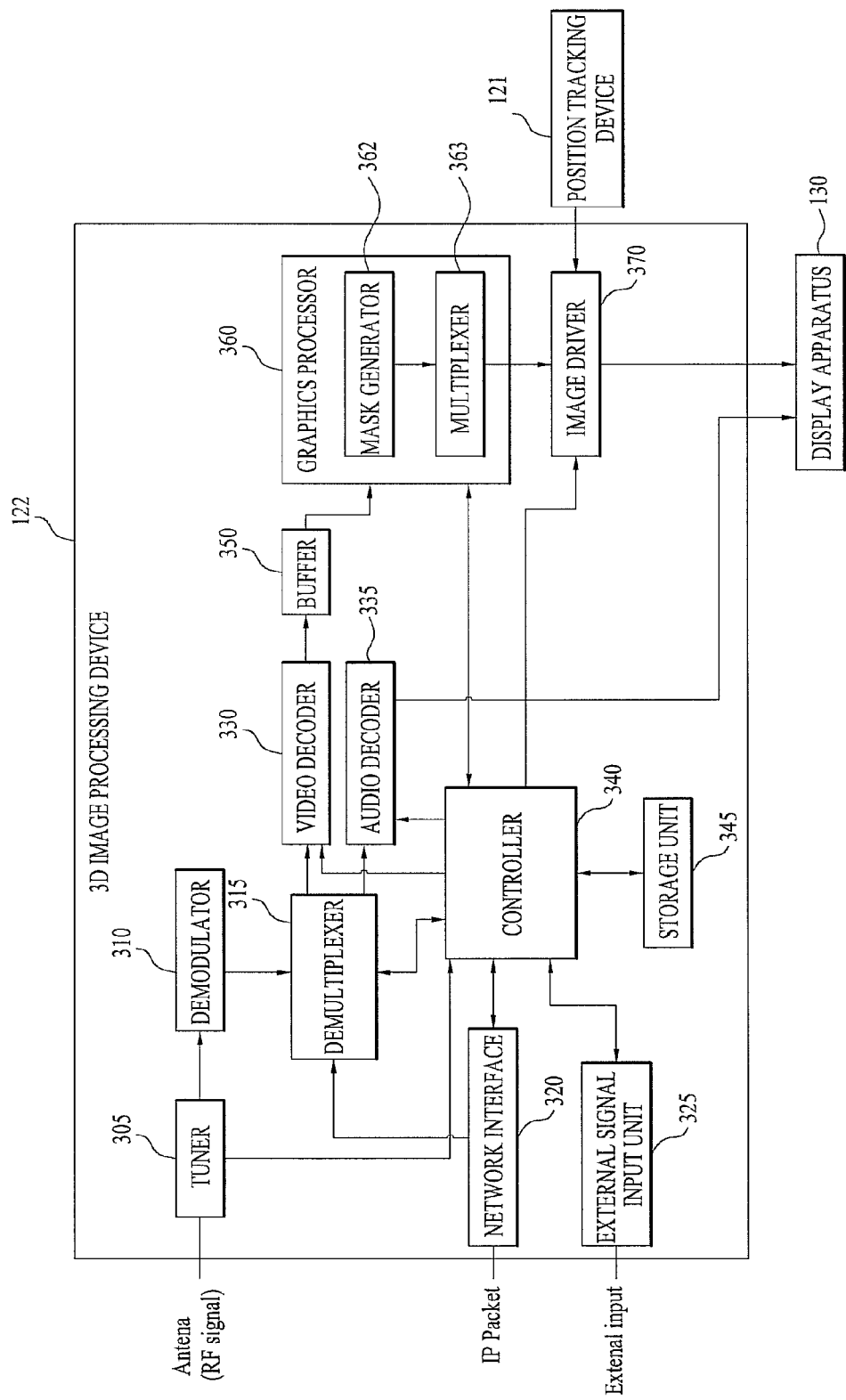
FIG. 3 is a block diagram illustrating a configuration of an exemplary embodiment of a 3D image processing device.

FIG. 3 is a block diagram illustrating a configuration of an exemplary embodiment of the 3D image processing device.

Referring to FIG. 3, the 3D image processing device 122 includes a tuner 305, a demodulator 310, a demultiplexer 315, a network interface 320, an external signal input unit 325, a video decoder 330, an audio decoder 335, a controller 340, a storage unit 345, a buffer 350, a graphics processor 360 and an image driver 370.

The tuner 305 selects a Radio Frequency (RF) broadcast signal corresponding to a channel selected by a user from among RF broadcast signals received through an antenna and converts the selected RF broadcast signal into an Intermediate Frequency (IF) signal or a base-band video or audio signal. The tuner 305 may receive an RF broadcast signal of a single carrier based on an Advanced Television System Committee (ATSC) method, or an RF broadcast signal of a plurality of carriers based on a Digital Video Broadcast (DVB) method.

In another embodiment, the 3D image processing device 122 may include at least two tuners. When using at least two tuners, the first and second tuners similarly select RF broadcast signals corresponding to a channel selected by the user from among RF broadcast signals received through the antenna and convert the selected RF broadcast signals into IF signals or baseband video or audio signals.

The second tuner may sequentially select RF broadcast signals of all broadcast channels, stored via a channel memory function, from among received RF broadcast signals and convert the selected RF broadcast signals into IF signals or baseband video or audio signals. The second tuner may periodically switch between broadcast channels. Thus, the 3D image processing device 122 may display an image of a broadcast signal converted via the first tuner and may also provide a thumbnail of images of several channels converted via the second tuner. In this case, the first tuner may convert a main RF broadcast signal selected by the user into an IF signal or baseband video or audio signal, and the second tuner may sequentially or periodically select all RF broadcast signals except for a main RF broadcast signal and convert the selected RF broadcast signals into IF signals or baseband video or audio signals.

The demodulator 310 receives a Digital IF (DIF) signal converted by the tuner 305 and demodulates the DIF signal. In one example, if the DIF signal output from the tuner 305 is an ATSC signal, the demodulator 310 performs 8-Vestigial Side Band (VSB) demodulation. In another example, if the DIF signal output from the tuner 305 is a DVB signal, the demodulator 310 performs Coded Orthogonal Frequency Division Multiple Access (COFDMA) demodulation.

The demodulator 310 may also perform channel decoding. For channel decoding, the demodulator 310 may include a Trellis decoder, a deinterleaver, and a Reed Solomon decoder to perform Trellis decoding, deinterleaving, and Reed Solomon decoding, respectively.

After performing demodulation and channel decoding, the demodulator 310 may output a Transport Stream (TS) signal. A video signal, an audio signal or a data signal may be multiplexed in the TS signal. In one example, the TS signal may be a Moving Picture Experts Group-2 (MPEG-2) TS in which an MPEG-2 video signal and a Dolby AC-3 audio signal are multiplexed. More specifically, the MPEG-2 TS may include a 4-byte header and a 184-byte payload.

The demultiplexer 315 may receive a stream signal from the demodulator 310, the network interface 320 and the external signal input unit 325. The demultiplexer 315 may demultiplex the received stream signal into a video signal, an audio signal and a data signal to output the demultiplexed signals respectively to the video decoder 330, the audio decoder 335 and the controller 340.

The video decoder 330 receives the video signal from the demultiplexer 315 and restores the received video signal for storage of the restored video signal in the buffer 350. The video signal may include a 3D video signal.

The audio decoder 335 receives an audio signal from the demultiplexer 315 and restores the received audio signal for output of the restored audio signal to the display apparatus 130.

The network interface 320 receives a packet from a network and transmits the packet to the network. The network interface 320 may receive an IP packet, which transmits broadcast data from a service providing server through the network. The broadcast data includes content, update messages that inform of whether or not content update is performed, meta data, service information and software code. The service information may include service information about a real-time broadcast service and service information about an Internet service. The Internet service includes a CoD service, a YouTube service, an information service for providing weather, news and local information and enabling information retrieval and the like, an entertainment service related to gaming, singing and the like, and a communication service related to TV mail and TV SMS services and the like, which may be provided through the Internet. Thus, in the present embodiment, the digital broadcast receiver includes a network TV, a Web TV and a broadband TV. The broadcast service may include the Internet service and a broadcast service transmitted through a terrestrial broadcast system, a satellite and a cable.

If the IP packet includes a stream signal, the network interface 320 may extract the stream signal from the IP packet to output the stream signal to the demultiplexer 315.

The external signal input unit 325 may provide an interface capable of connecting an external device and the 3D image processing device 122 to each other. The external device refers to a variety of types of video or audio output devices, such as a Digital Versatile Disc (DVD) player, a Blu-ray player, a gaming device, a camcorder and a computer (e.g., a notebook computer). The 3D image processing device 122 may display video and audio signals transmitted from the external signal input unit 325 and may store or use data signals.

The controller 340 executes a command and performs an operation associated with the 3D image processing device 122. For example, the controller 340 may control data reception and processing and input and output of signals between constituent elements of the 3D image processing device 122 using commands found in the storage unit 345. The controller 340 may be implemented as a single chip, a plurality of chips, or a plurality of electric components. For example, a variety of architectures including a dedicated or embedded processor, a single purpose processor, a controller, an Application Specific Integrated Circuit (ASIC), etc. may be used as the controller 340.

The controller 340 executes computer code together with an Operating System (OS) and generates and uses data. The OS is generally known and therefore a detailed description thereof is omitted. An example of the OS may include Windows OS, Unix, Linux, Palm OS, DOS, Android, and Mac OS. The OS, other computer codes and data may be present within the storage unit 345 which is linked to and operated by the controller 340.

The storage unit 345 generally stores program code and data used by the 3D image processing device 122. For example, the storage unit 345 may be implemented as a Read-Only Memory (ROM), a Random Access Memory (RAM), a hard disk drive, etc. The program code and data may be stored in a separable storage medium and, if necessary, may be loaded or installed onto the 3D image processing device 122. The separable storage medium may include a CD-ROM, a PC card, a memory card, a floppy disk, a magnetic tape and a network component.

The graphics processor 360 controls the display apparatus 130 so as to display video data stored in the buffer 350. The graphics processor 360 may include a mask generator 362 and a multiplexer 363.

The mask generator 362 generates a view mask with respect to a 3D image. The mask generator 362 may generate a mask a on a per view basis using the following Equation 1:

$$\alpha(i,k) = W(k - V_i) \quad \text{[Equation 1]}$$

Figure 4:
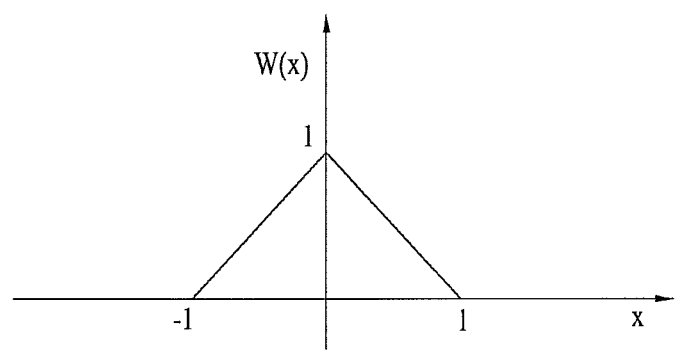
FIG. 4 is a graph of a function W(x)

In Equation 1, 'i' denotes a horizontal number of a sub-pixel, 'Vi' denotes a view number of the sub-pixel i under the assumption that the period of a 3D image pixel is Q, and 'k' is a view number. A graph of a function W(x) is illustrated in FIG. 4.

The multiplexer 363 may determine a final color of a pixel using the view mask generated by the mask generator 362. The multiplexer 363 may determine the final color MCi using the following Equation 2:

$$MC_i = \sum_{k=0}^{N-1} \alpha(i,k) * C(i,k) \quad \text{[Equation 2]}$$

In Equation 2, 'c(i, k)' denotes the color of the sub pixel i of an image having a view number k.

The image driver 370 may output a control signal to the display apparatus 130 so as to display the final color MCi. The image driver 370 may also output the position or displacement of the 3D image filter calculated by the position tracking device 121 to the display apparatus 130. The output position and displacement of the 3D image filer may be output to the display apparatus 130 via a General Purpose Input/Output (GPIO) pin.

In some embodiments, the position tracking device 121 may directly output the position and displacement of the 3D image to the display apparatus 130.

Figure 5:
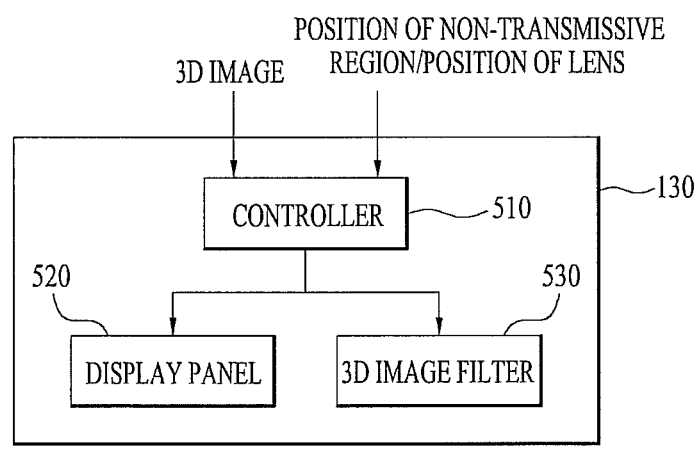
FIG. 5 is a block diagram illustrating a configuration of an exemplary embodiment of a display apparatus.

FIG. 5 is a block diagram illustrating a configuration of an exemplary embodiment of the display apparatus.

Referring to FIG. 5, the display apparatus 130 may include a controller 510, a display panel 520 and a 3D image filter 530.

The controller 510 may control movement of a barrier or a lens of the 3D image filter 530 based on the position of the 3D image filter calculated by the position tracking device 121. The controller 510 may calculate a displacement of the 3D image filter by calculating a difference between the position of the 3D image filter calculated by the position tracking device 121 and a current position of the 3D image filter and then, may control movement of the barrier or the lens based on the calculated displacement of the 3D image filter. In some embodiments, the controller 510 may control movement of the transmissive region and non-transmissive region of the 3D image filter 530 based on a position of the non-transmissive region calculated by the position tracking device 121. In some embodiments, the controller 510 may control movement of the lens of the 3D image filter 530 based on a position of the lens calculated by the position tracking device 121.

The controller 510 may control movement of the barrier or the lens of the 3D image filter 530 based on the displacement of the 3D image filter calculated by the position tracking device 121.

The display panel 520 may display the final color MCi on a corresponding pixel or sub-pixel according to a control signal output from the 3D image processing device 122. That is, the display panel 520 may display a parallax image in which a left view image and a right view image are combined with each other.

The 3D image filter 530 allows the parallax image displayed on the display panel 520 to be seen as a 3D image by the viewer, and may include transmissive regions and non-transmissive regions arranged at a constant distance. Light emitted from the display panel 520 reaches the left eye or the right eye of the viewer by passing through the transmissive regions. The 3D image filter 530 may be one of a liquid crystal parallax barrier and a liquid crystal lenticular filter.

If the 3D image filter 530 is a liquid crystal parallax barrier, the non-transmissive regions may form a barrier and a pair of the transmissive region and the non-transmissive region may be called a pitch. The transmissive region and non-transmissive region of the 3D image filter 530 may be moved under control of the controller 510. In this case, the 3D image filter may be stationary.

If the 3D image filter 530 is a liquid crystal lenticular filter, the transmissive region and the non-transmissive region may be divided from each other by a lens. One lens may be called a pitch. The lens of the 3D image filter 530 may be moved under control of the controller 510. In this case, the 3D image filter 530 may be stationary.

Figure 6:
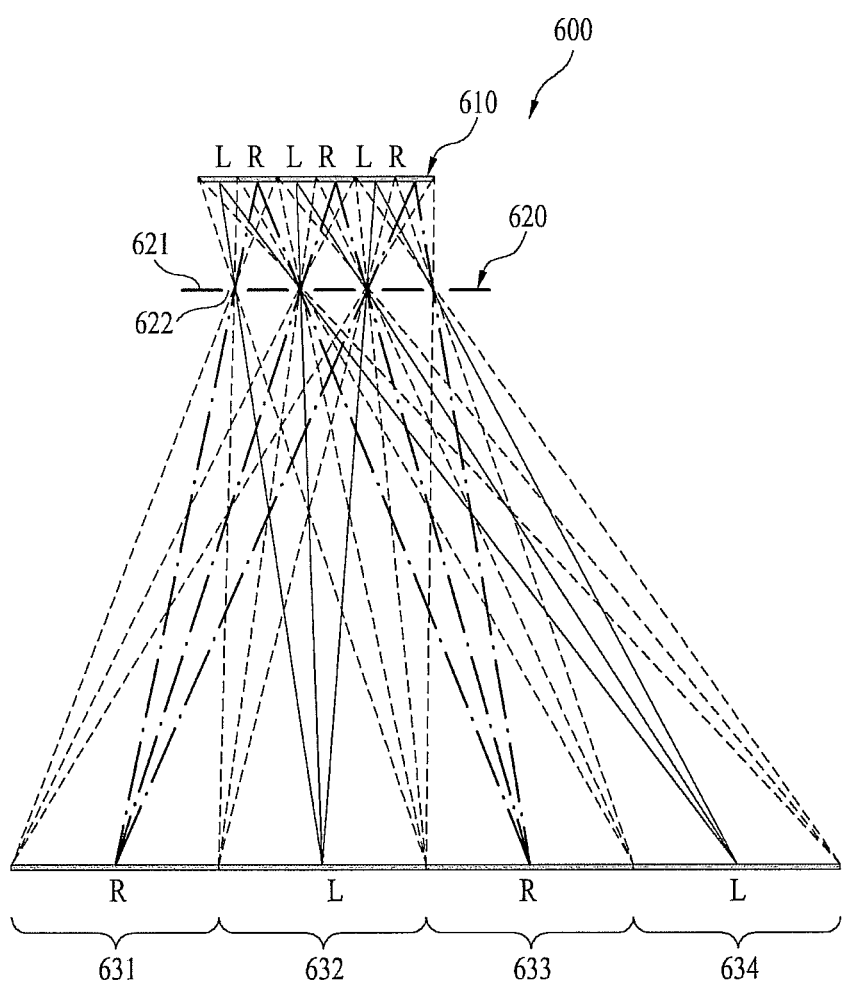
FIG. 6 is a diagram illustrating image separation via a 3D image filter.

FIG. 6 is a diagram illustrating image separation via the 3D image filter.

Referring to FIG. 6, a 3D image panel 600 includes a display panel 610, which displays a parallax image in which a left view image L and a right view image R are combined with each other, and a 3D image filter 620 in which non-transmissive regions 621 and transmissive regions 622 are arranged at a constant distance. The display panel 610 is one example of the display panel 520 of FIG. 5, and the 3D image filter 620 is one example of the 3D image filter 530 of FIG. 5.

The 3D image filter 620 is forwardly spaced apart from the display panel 610 by a predetermined distance, such that the non-transmissive regions 621 and the transmissive regions 622 are alternately arranged in a direction parallel to the display panel 610.

When the display panel 610 displays a parallax image corresponding to the left view image L and the right view image R, the viewer views the displayed left view image L and right view image R through the 3D image filter 620, which allows a left eye and right eye of the viewer to independently view the left view image L and the right view image R provided from the display panel 610, enabling the viewer to perceive 3D imagery.

A location where the viewer can well view a 3D image is referred to as a sweet spot. That is, the sweet spot means a location where cross-talk (overlap of the left view image L and the right view image R) and image flipping (inversion of the left view image L and the right view image R) do not occur. Locations 632 and 634 may correspond to sweet spots for viewing the left view image L and locations 631 and 633 may correspond to sweet spots for viewing the right view image R. If the right eye of the viewer is located at the location 632 or 634 and the left eye of the viewer is located at the location 631 or 633, image flipping may occur.

Figure 7:
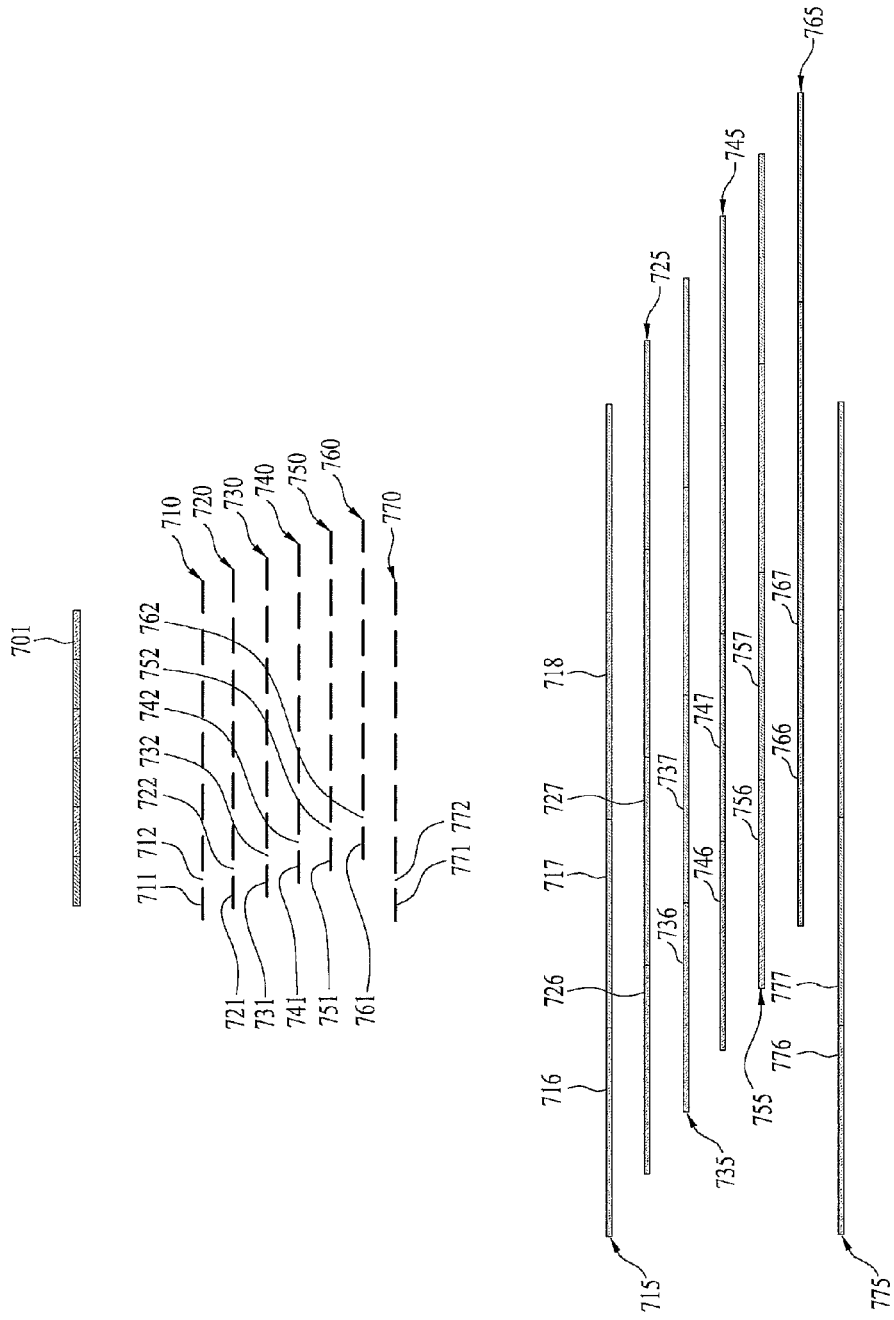
FIG. 7 is a diagram illustrating shift of a sweet spot depending on position change of the 3D image filter.
Figure 8A:
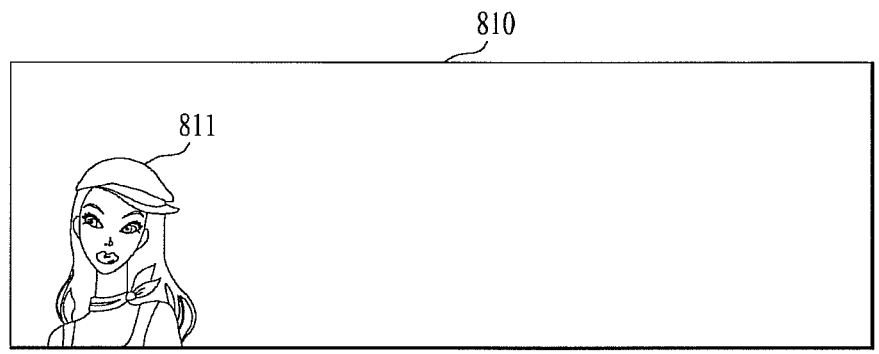
FIGS. 8A to 8D are diagrams illustrating video frames obtained by capturing an image of a viewer using the 3D image display system.
Figure 8B:
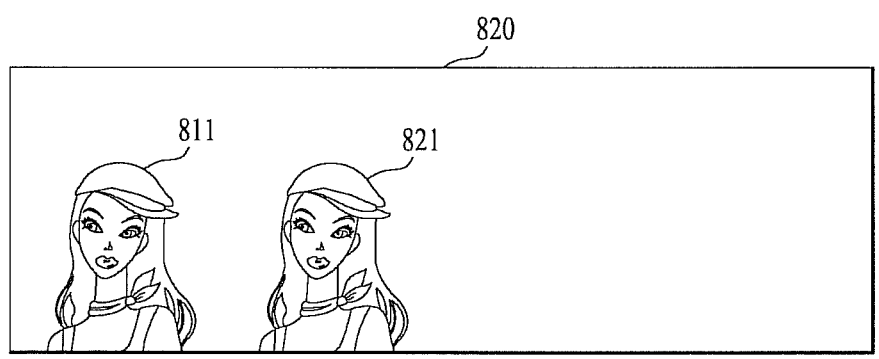
Figure 8C:
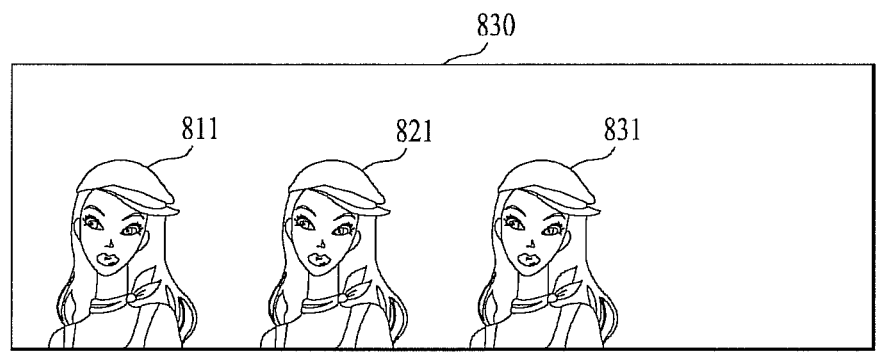
Figure 8D:
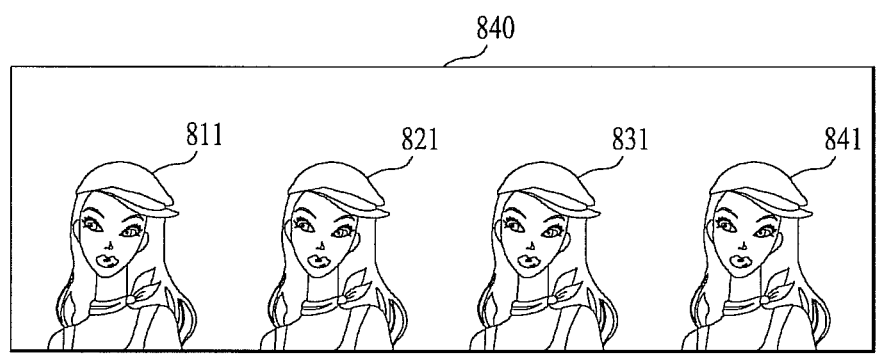

FIG. 7 is a diagram illustrating shift of the sweet spot depending on position change of the 3D image filter.

Referring to FIG. 7, in the case of a 3D image filter 710 having an array of non-transmissive regions 711 and transmissive regions 712, there is provided a sweet spot 715 in which sweet spots 717 for viewing the left view image L displayed on a display panel 701 and sweet spots 716 for viewing the right view image R displayed on the display panel 701 are alternately arranged.

In the case of a 3D image filter 720 having an array of non-transmissive regions 721 and transmissive regions 722, there is provided a sweet spot 725 in which sweet spots 727 for viewing the left view image L displayed on the display panel 701 and sweet spots 726 for viewing the right view image R displayed on the display panel 701 are alternately arranged.

In the case of a 3D image filter 730 having an array of non-transmissive regions 731 and transmissive regions 732, there is provided a sweet spot 735 in which sweet spots 737 for viewing the left view image L displayed on the display panel 701 and sweet spots 736 for viewing the right view image R displayed on the display panel 701 are alternately arranged.

In the case of a 3D image filter 740 having an array of non-transmissive regions 741 and transmissive regions 742, there is provided a sweet spot 745 in which sweet spots 747 for viewing the left view image L displayed on the display panel 701 and sweet spots 746 for viewing the right view image R displayed on the display panel 701 are alternately arranged.

In the case of a 3D image filter 750 having an array of non-transmissive regions 751 and transmissive regions 752, there is provided a sweet spot 755 in which sweet spots 757 for viewing the left view image L displayed on the display panel 701 and sweet spots 756 for viewing the right view image R displayed on the display panel 701 are alternately arranged.

In the case of a 3D image filter 760 having an array of non-transmissive regions 761 and transmissive regions 762, there is provided a sweet spot 765 in which sweet spots 767 for viewing the left view image L displayed on the display panel 701 and sweet spots 766 for viewing the right view image R displayed on the display panel 701 are alternately arranged.

In the case of a 3D image filter 770 having an array of non-transmissive regions 771 and transmissive regions 772, there is provided a sweet spot 775 in which sweet spots 777 for viewing the left view image L displayed on the display panel 701 and sweet spots 776 for viewing the right view image R displayed on the display panel 701 are alternately arranged.

FIGS. 8A to 8D are diagrams illustrating video frames obtained by capturing an image of a viewer using the 3D image display system.

Referring to FIGS. 8A to 8D, the 3D image processing system 120 may detect a position 821 of the viewer using a video frame 820. The 3D image processing system 120 may detect the position 821 of the viewer by recognizing a face area. The 3D image processing system 120 may recognize the face area based on an algorithm using the symmetry of a face, an algorithm using hair color and face color and an algorithm using the profile of a face. The position detector 210 may also recognize a face area by extracting skin color information from the video frame.

The 3D image processing system 120 may calculate a movement speed V of the viewer using the detected position 821 of the viewer and a previously detected position 811 of the viewer as represented by the following Equation 3.

$$V = H/T \qquad \text{[Equation 3]}$$

In Equation 3, 'H' denotes a distance between the detected position 821 of the viewer and the previously detected position 811 of the viewer, and 'T' denotes an image capture time interval between a video frame 810 and the video frame 820.

The 3D image processing system 120 may calculate a position of the viewer when a preset time passes, using the detected position 821 of the viewer and the calculated movement speed V based on the following algorithm.

for $(k=1, k<N+1, k++)$ $$\{\text{Position of the viewer at delay time} + kt\} \qquad \text{[Algorithm 1]}$$

In Algorithm 1, 'delay time+kt' denotes a preset time. The delay time may be caused by at least one of camera capture delay, detection process delay and image driver frame rate delay.

The delay time 't' may be determined by the following Equation 4.

$$t = (1/M)/N \qquad \text{[Equation 4]}$$

In Equation 4, 'M' denotes the maximum frame rate of a camera, and 'N' may be determined by the following Equation 5.

$$N > (V*t)/T \qquad \text{[Equation 5]}$$

In Equation 5, 'T' is a position change threshold of a viewer's head which causes image variation.

The position P of the viewer at delay time+kt may be calculated by the following Equation 6.

$$P = P_0 + VT \qquad \text{[Equation 6]}$$

In Equation 6, '$P_o$' denotes the detected position of the viewer and 'T' is delay time+kt.

Based on the above Algorithm 1, the 3D image processing system 120 may estimate N positions of the viewer at a time interval t within a given time period for capturing video frames. Thus, when using a camera for capturing an image at a frame rate of M Hz, the camera may exhibit the effect of capturing an image at a frame rate of M*N Hz.

The 3D image processing system 120 may detect a position 831 of the viewer at a time when an image frame 830 is captured and may calculate a movement speed of the viewer using at least one of the previously detected positions 811 and 821 of the viewer.

The 3D image processing system 120 may detect a position 841 of the viewer at a time when an image frame 840 is captured and may calculate a movement speed of the viewer using at least one of the previously detected positions 811, 821 and 831 of the viewer.

The 3D image processing system 120 may calculate a position of the transmissive region or the non-transmissive region of the 3D image filter at a particular time based on the position of the viewer estimated at the corresponding time. When the viewer is located at the sweet spot 715, the 3D image processing system 120 calculates the position of the non-transmissive region or the transmissive region of the 3D image filter 710 as the position of the non-transmissive region or the transmissive region of the 3D image filter. That the viewer is located at the sweet spot 715 means that the left eye of the viewer is located at the location 717 and the right eye of the viewer is located at the location 718.

If the viewer moves and is located at the sweet spot 735, the 3D image processing system 120 calculates the position of the non-transmissive region or the transmissive region of the 3D image filter 730 as the position of the non-transmissive region or the transmissive region of the 3D image filter. The 3D image processing system 120, as illustrated in FIG. 7, may store a Table in which the sweet spot and the position of the non-transmissive region or the transmissive region of the 3D image filter depending on the sweet spot are recorded on a per line basis. The 3D image processing system 120 may read the position of the non-transmissive region or the transmissive region of the 3D image filter associated with the estimated or detected position of the viewer from the Table.

If the viewer moves and is located at the sweet spot 775, the 3D image processing system 120 calculates the position of the non-transmissive region or the transmissive region of the 3D image filter 770 as the position of the non-transmissive region or the transmissive region of the 3D image filter.

When the viewer moves from the sweet spot 715 to the sweet spot 735, the 3D image processing system 120 may calculate a displacement of the 3D image filter by calculating a difference between the position of the non-transmissive region 711 and the position of the non-transmissive region 731, and may also calculate a displacement of the 3D image filter by calculating a difference between the position of the transmissive region 712 and the position of the transmissive region 732.

Figure 9:
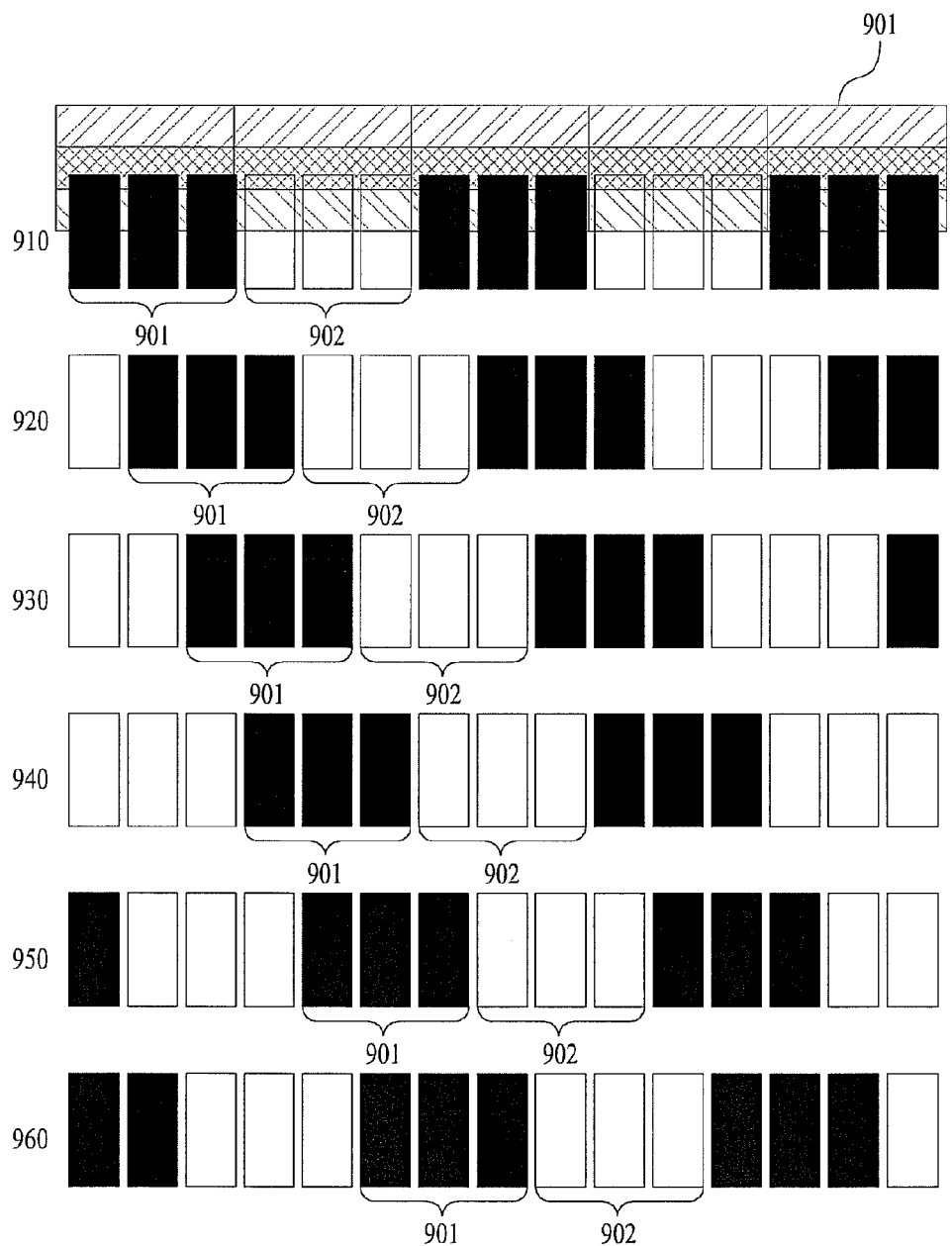
FIG. 9 is a diagram illustrating movement of a transmissive region and a non-transmissive region of a barrier type 3D image filter.

FIG. 9 is a diagram illustrating movement of a transmissive region and a non-transmissive region of a barrier type 3D image filter.

Referring to FIG. 9, in a state in which 3D image filters 910 to 960 are stationary, a barrier (i.e., an electrode of an LC filter) may be split so as to be moved when power is applied to a split unit barrier (i.e. a unit electrode). Specifically, as power applied to the unit barrier is turned on or off, movement of the non-transmissive region 901 and the transmissive region 902 is realized. The number of the unit barriers may be four or more on a per pitch basis. If the number of the unit barriers per pitch is two, the barrier does not move whenever the unit barriers are turned on or off, but may be driven such that an open area and a closed area of the barrier are reversed.

The 3D image filters 910 to 960 respectively represent positions of the non-transmissive regions 901 and the transmissive regions 902. Each of the non-transmissive region 910 and the transmissive region 902 consists of three unit barriers. As the first unit barrier and the fourth unit barrier of the 3D image filter 910 are turned on or off, the non-transmissive region 901 of the 3D image filter 910 is moved to a position of the non-transmissive region 901 of the 3D image filter 920. Similarly, as the seventh unit barrier and the tenth unit barrier of the 3D image filter 920 are turned on or off, the transmissive region 902 of the 3D image filter 910 is moved to a position of the transmissive region 902 of the 3D image filter 920.

Figure 10:
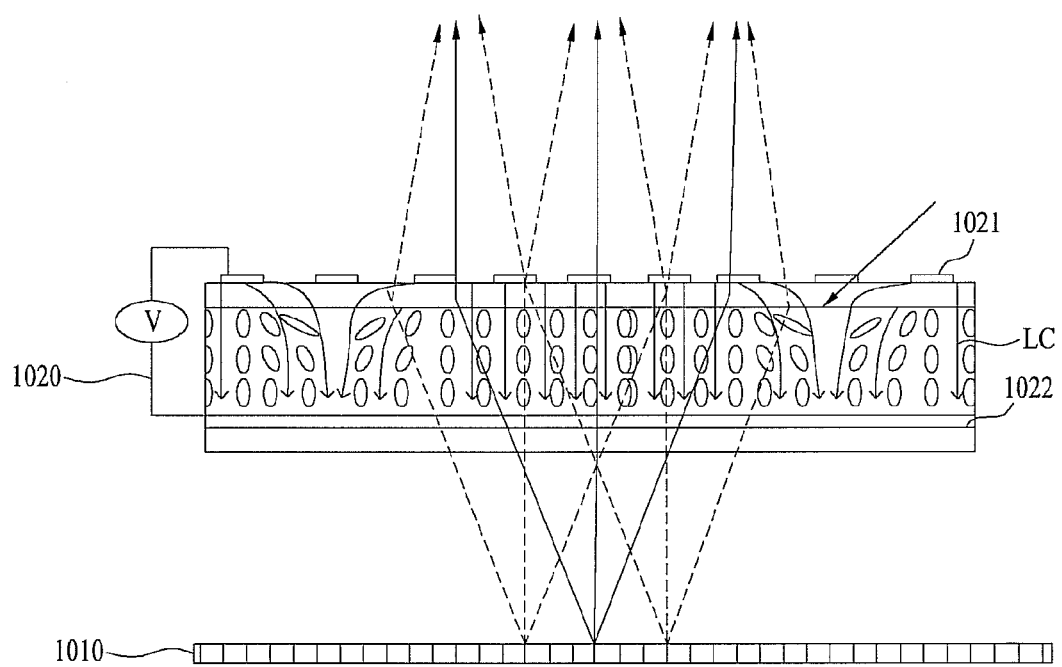
FIG. 10 is a diagram illustrating the principle of a liquid crystal lenticular lens.
Figure 11:
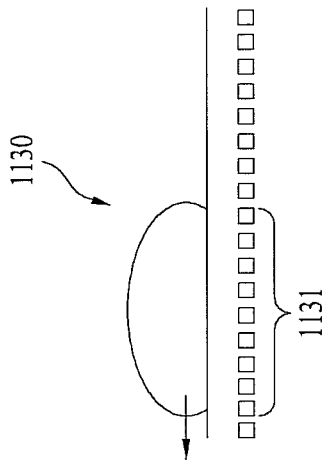
FIG. 11 is a diagram illustrating movement of a lenticular lens of a 3D image filter.
Figure 11:
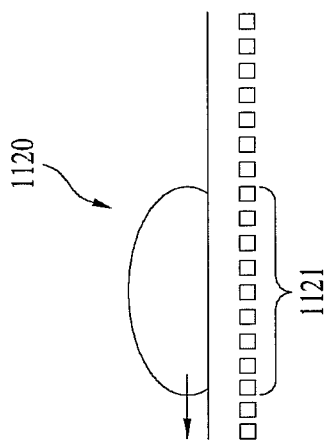
Figure 11:
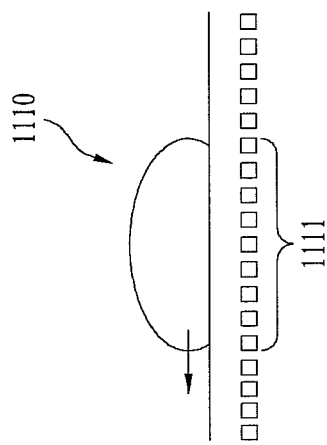

FIG. 10 is a diagram illustrating the principle of a liquid crystal lenticular lens, and FIG. 11 is a diagram illustrating movement of the lenticular lens.

Referring to FIGS. 10 and 11, the liquid crystal lenticular lens 1020 may be comprised of transparent Indium Tin Oxide (ITO) electrodes and liquid crystals located between the transparent ITO electrodes. The LC lenticular 1020 serves to adjust refraction of light emitted from a display panel 1010 using the liquid crystals, allowing left eye and right view images to be located at appropriate sweet spots. That is, the liquid crystals form unit lenses for refracting light. The liquid crystal lenticular lens 1020 may adjust the position, orientation and arrangement of liquid crystals by adjusting voltage applied to the transparent ITO electrodes. Thus, the position of the lens is changeable according to the position, orientation and arrangement of liquid crystals and thus, the associated sweet pot is changeable.

The liquid crystal lenticular lens 1020 may include unit lenses, each of which contains a preset number of split unit electrodes. As voltage corresponding to the shape of a lens to be formed is applied so as to be distributed on a per unit electrode basis, an index of refraction of liquid crystals is changed, enabling formation of the lens. In FIG. 11, a lens 1110 is formed by applying voltage to nine unit electrodes 1111. The lens 1110 may be a unit lens in which a single transmissive region and a single non-transmissive region are separated from each other and may constitute a pitch. Movement of the unit lens causes movement of the transmissive region and the non-transmissive region.

A liquid crystal lenticular lens 1020 may realize movement of unit lenses by adjusting voltage applied to the unit electrodes. Specifically, in the liquid crystal lenticular lens 1020, as voltage applied respectively to a predetermined number of unit electrodes constituting the unit lens is again applied to the predetermined number of unit electrodes which are moved by the number of unit electrodes having a length equal to a given displacement, the unit lens may be moved by the displacement. In one example, if voltage applied respectively to nine unit electrodes 1111 constituting the lens 1110 is again applied to nine unit electrodes 1121 moved leftward by two unit electrodes, the lens 1110 is moved leftward by the two unit electrodes to a position of a lens 1120. In another example, if voltage applied respectively to the nine unit electrodes 1121 constituting the lens 1120 is again applied to nine unit electrodes 1131 moved leftward by one unit electrode, the lens 1120 is moved leftward by the one unit electrode to a position of a lens 1130.

Figure 12:
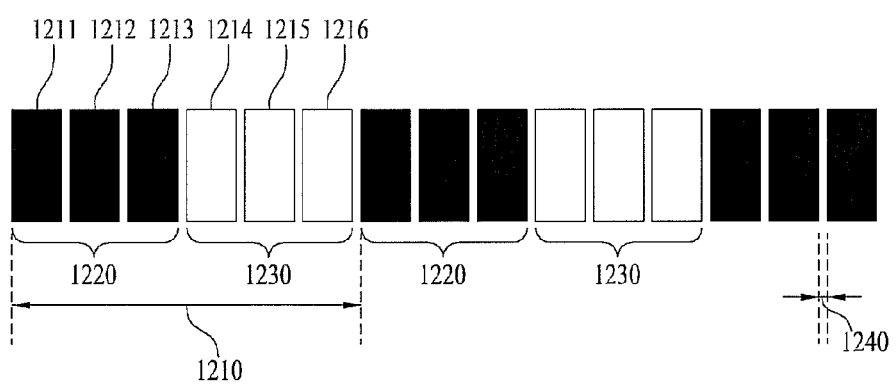
FIG. 12 is a diagram illustrating an electrode configuration of a barrier filter.

FIG. 12 is a diagram illustrating an electrode configuration of a barrier filter.

Referring to FIG. 12, a single barrier may be divided into a plurality of unit electrodes. A pitch 1210 may be comprised of six unit electrodes 1211 to 1216. The three unit electrodes 1211, 1212 and 1213 may form the non-transmissive region 1220 and the three unit electrodes 1214, 1215 and 1216 may form the transmissive region 1230. The unit electrodes may selectively form the non-transmissive region or the transmissive region according to whether or not voltage is applied thereto.

An electrode gap 1240 may be present between unit electrodes. In a normal black mode, voltage of the electrode gap 1240 is always Off and therefore, a space corresponding to the electrode gap 1240 is black. On the other hand, in a normal white mode, voltage of the electrode gap 1240 is always On and therefore, a space corresponding to the electrode gap 1240 is white, causing light leakage through the electrode gap 1240. The light leakage may cause cross-talk.

To prevent light leakage through the electrode gap 1240, a Black Matrix (BM) may be used. The BM is applicable when the area of the electrode gap is 1% or more of the area of the barrier filter.

Figure 13:
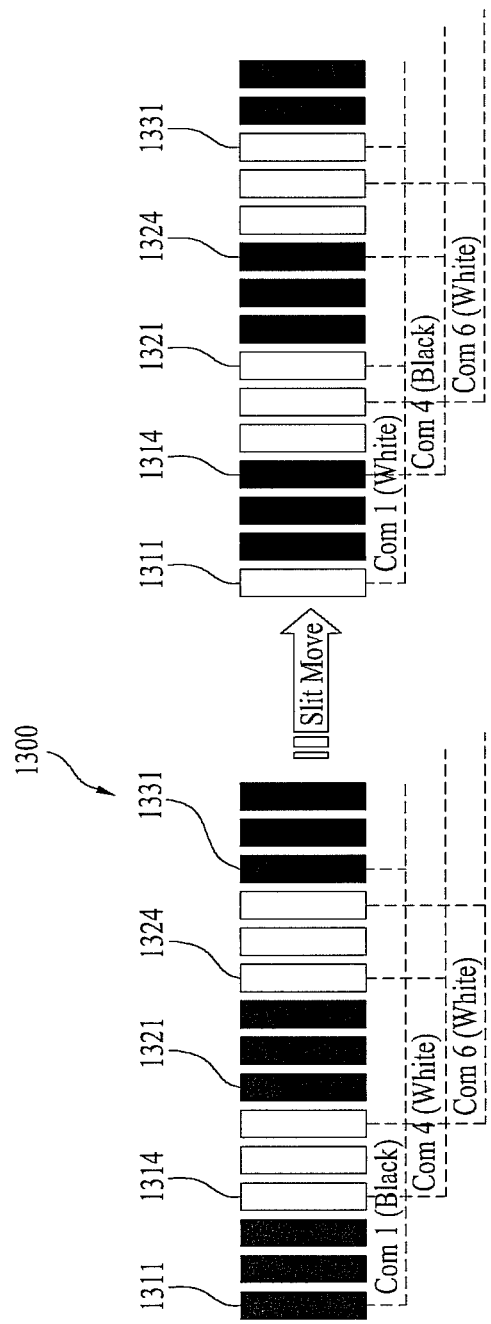
FIG. 13 is a diagram illustrating driving of the barrier filter.

FIG. 13 is a diagram illustrating driving of the barrier filter.

Referring to FIG. 13, in the case where six unit barriers are present per pitch, electrode driving may be repeated according to the order of the six unit barriers. In one example, to move the barrier filter by a single unit barrier, the first unit barriers 1311, 1321 and 1331 of the respective pitches may be changed from black (voltage is On in a normal white mode or is Off in a normal black mode) to white and the fourth unit barriers 1314 and 1324 of the respective pitches may be changed from white (voltage is Off in a normal white mode or is On in a normal black mode) to black.

The barrier filter 1300 may be configured in such a way that the unit barriers located at the same position as in the respective pitches are simultaneously controlled. Specifically, the electrodes of the unit barriers located at the same position as in the respective pitches may be simultaneously controlled by being commonly bound to a panel or may be driven by being commonly bound to a Flexible Printed Circuit (FPC) board. This may reduce manufacturing and driving costs and electric consumption and alleviate circuit complexity as compared to individual driving of all unit electrodes.

Figure 14:
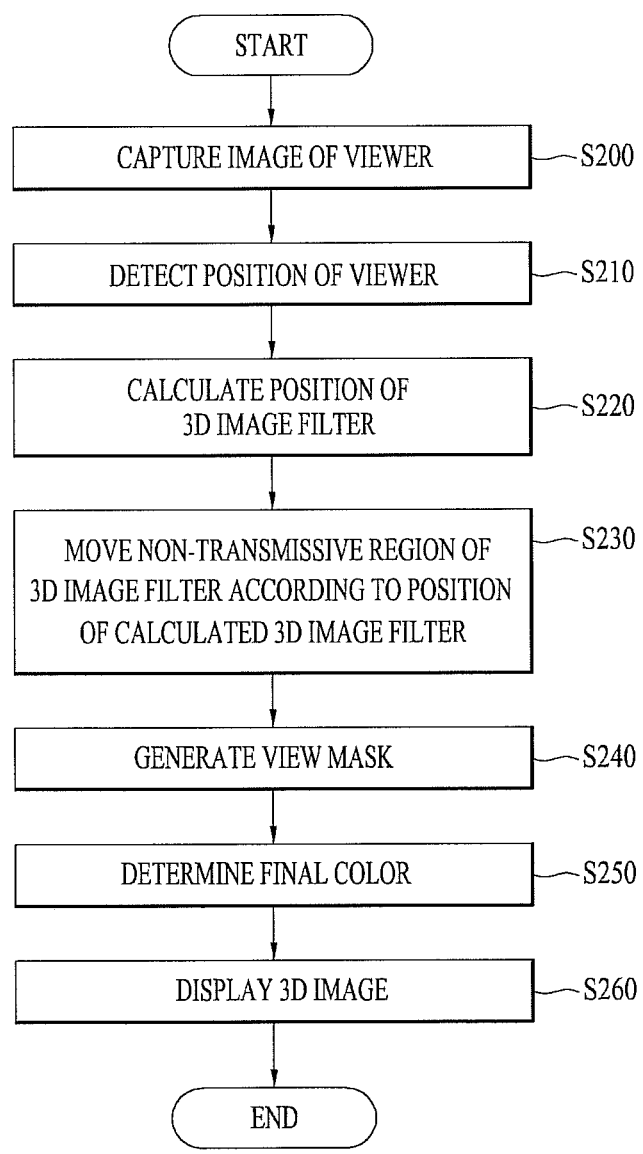
FIG. 14 is a flowchart illustrating an implementation procedure of an exemplary embodiment of a method of displaying a 3D image.

FIG. 14 is a flowchart illustrating an implementation procedure of an exemplary embodiment of a method of displaying a 3D image.

Referring to FIG. 14, the camera 110 captures an image of the viewer (S200). The camera 110 may capture an image of the viewer according to a preset Hertz or a given Hertz and may continuously output the captured image to the 3D image processing system 120 in real time.

The 3D image processing system 120 detects a position of the viewer using a video frame included in the image captured by the camera 110 (S210). The 3D image processing system 120 may calculate a movement speed of the viewer using the detected position of the viewer and at least one of previously detected positions of the viewer. Then, the 3D image processing system 120 may estimate a position of the viewer when a preset time passes, using the detected position of the viewer and the calculated movement speed of the viewer.

The 3D image processing system 120 calculates a position of the 3D image filter based on the detected position of the user (S220). The position of the 3D image filter may correspond to a position of the non-transmissive region of the 3D image filter or a position of the lens. To calculate the position of the 3D image filter, the 3D image processing system 120 may calculate positions of the transmissive region and the non-transmissive region having a sweet spot corresponding to the detected position of the viewer, or may read the position of the 3D image filter associated with the detected position of the viewer from a Table stored in the storage unit 845.

The 3D image processing system 120 may calculate a displacement of the 3D image filter based on the calculated position of the 3D image filter. In some embodiments, the 3D image processing system 120 may calculate the displacement of the 3D image filter by calculating a difference between the calculated positions of the transmissive region and the non-transmissive region and current positions of the transmissive region and the non-transmissive region. In some embodiments, the 3D image processing system 120 may calculate the displacement of the 3D image filter by calculating a difference between the calculated lens position and a current lens position.

The display apparatus 130 moves the transmissive region and the non-transmissive region of the 3D image filter according to the displacement of the 3D image filter calculated by the 3D image processing system 120 (S230). The display apparatus 130 may move the transmissive region and the non-transmissive region using a method as illustrated in FIG. 9. In an alternative embodiment, the display apparatus 130 may move the lens of the 3D image filter according to the displacement of the 3D image filter calculated by the 3D image processing system 120. In this case, the 3D image processing system 120 may move the lens using a method as illustrated in FIG. 10.

The 3D image processing system 120 generates a view mask for a 3D image (S240). The 3D image processing system 120 may generate the mask on a per view basis by the above described Equation 1.

The 3D image processing system 120 determines a final color of a pixel of each view image included in the 3D image using the generated view mask and a color of the pixel (S250). The 3D image processing system 120 may determine the final color by the above described Equation 2.

The display apparatus 130 displays the final color determined by the 3D image processing system 120 (S260). The left view image and the right view image produced by the displayed final color may respectively filtered by the 3D image filter, the transmissive region and the non-transmissive region of which have been moved in Step S230 and the filtered images may reach the left eye and the right eye of the viewer. Thus, the 3D image display system may adjust a sweet spot to suit the position of the viewer, which allows the viewer to view a 3D image without crosstalk or image flipping even when the viewer moves.

Embodiments may be realized as computer-readable code written on a computer-readable recording medium. The computer-readable recording medium may be any type of recording device in which data can be stored in a computer-readable manner. Examples of the computer-readable recording medium include a ROM, a RAM, a CD-ROM, a magnetic tape, a floppy disc, an optical data storage, and a carrier wave (e.g., data transmission over the Internet). The computer-readable recording medium may be distributed over a plurality of computer systems connected to a network so that computer-readable code is written thereto and executed therefrom in a decentralized manner.

As is apparent from the above description, with a 3D image display apparatus and a 3D image display method in accordance with exemplary embodiments, a sweet spot of a 3D image is controlled to suit movement of a viewer, which may enlarge a viewing angle of the viewer and may prevent crosstalk and image flipping even when the viewer moves.

Embodiments may be directed to an apparatus and a method for displaying a 3-dimensional image that substantially obviate one or more problems due to limitations and disadvantages of the related art.

An embodiment may provide an apparatus capable of preventing crosstalk and image flipping occurring when displaying a 3-dimensional image, and a method of preventing crosstalk and image flipping occurring when displaying a 3-dimensional image.

To achieve these objects and other advantages, as embodied and broadly described herein, a method of displaying a 3-Dimensional (3D) image includes capturing an image of a viewer, detecting a position of the viewer using a video frame included in the captured image, calculating a position of a non-transmissive region of a 3D image filter based on the detected position of the viewer, and moving the non-transmissive region of the 3D image filter according to the calculated position of the non-transmissive region. The 3D image filter may be stationary. A pitch of the 3D image filter may include a plurality of unit barriers.

Power of at least one of the plurality of unit barriers may be converted, so as to move the non-transmissive region.

Power of at least one unit barrier located in one side of the non-transmissive region and of at least one of unit barriers included in a transmissive region next to the other side of the non-transmissive region may be converted, so as to move the non-transmissive region.

The number of the unit barriers, power applied to which is converted, may be proportional to a displacement of the non-transmissive region.

The unit barriers may neighbor each other when power of a plurality of the unit barriers within the non-transmissive region is converted.

The 3D image filter may include a Black Matrix (BM) configured to prevent light leakage between neighboring unit barriers.

Power of the unit barriers having the same order in respective pitches of the 3D image filter may be commonly controlled.

In accordance with another aspect, a method of displaying a 3-dimensional (3D) image includes capturing an image of a viewer, detecting a position of the viewer using a video frame included in the captured image, calculating a position of a lens of a 3D image filter based on the detected position of the viewer, and moving the lens of the 3D image filter according to the calculated position of the lens. The lens may be formed as an index of refraction of liquid crystals is changed by voltage applied to a plurality of unit electrodes. Distribution of the applied voltage may be moved on a per unit electrode basis, so as to move the lens.

In accordance with a further aspect, an apparatus of displaying a 3-Dimensional (3D) image includes a camera unit configured to capture an image of a viewer, a position tracking device configured to detect a position of the viewer using a video frame included in the captured image and calculate a position of a non-transmissive region of a 3D image filter based on the detected position of the viewer, and a display unit configured to move the non-transmissive region of the 3D image filter according to the calculated position of the non-transmissive region. The 3D image filter may be stationary. A pitch of the 3D image filter may include a plurality of unit barriers.

The display unit may move the non-transmissive region by converting power of at least one of the plurality of unit barriers.

The display unit may move the non-transmissive region by converting power of at least one unit barrier located in one side of the non-transmissive region and of at least one of unit barriers included in a transmissive region next to the other side of the non-transmissive region.

The number of the unit barriers, power applied to which is converted, may be proportional to a displacement of the non-transmissive region.

The unit barriers may neighbor each other when power of a plurality of the unit barriers within the non-transmissive region is converted.

The 3D image filter may include a Black Matrix (BM) configured to prevent light leakage between neighboring unit barriers.

The display unit may commonly control power of the unit barriers having the same order in respective pitches of the 3D image filter.

Any reference in this specification to "one embodiment," "an embodiment," "example embodiment," etc., means that a particular feature, structure, or characteristic described in connection with the embodiment is included in at least one embodiment. The appearances of such phrases in various places in the specification do not necessarily refer to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of displaying a 3-Dimensional (3D) image, the method comprising:
    capturing images of a viewer;
    detecting a current and previous position of the viewer using a video frame included in the captured images;
    calculating a movement speed of the viewer using the detected current and previous position of the viewer;
    estimating a position of the viewer after a predetermined time using the detected current position of the viewer and the calculated movement speed of the viewer;
    calculating positions of a non-transmissive region of a 3D image filter based on the detected current position of the viewer and the estimated position of the viewer;
    calculating a displacement of the non-transmissive region of the 3D image filter based on the calculated positions; and
    moving the non-transmissive region of the 3D image filter according to the calculated displacement of the non-transmissive region,
    wherein a liquid crystal lens constitute a pitch by being separated by a single transmissive region and a single non-transmissive region causing the moving of the non-transmissive region, and
    wherein movement of the liquid crystal lens depend on adjusting voltage applied respectively to a predetermined number of unit electrodes that are moved by a number of unit electrodes having a length equal to a given displacement.

2. The method according to claim 1, wherein a pitch of the 3D image filter includes a plurality of unit barriers.

3. The method according to claim 2, wherein power of at least one of the plurality of unit barriers is converted, so as to move the non-transmissive region.

4. The method according to claim 2, wherein power of at least one unit barrier located in one side of the non-transmissive region and of at least one of unit barriers included in a transmissive region next to the other side of the non-transmissive region is converted, so as to move the non-transmissive region.

5. The method according to claim 2, wherein the 3D image filter includes a Black Matrix (BM) configured to prevent light leakage between neighboring unit barriers.

6. The method according to claim 2, wherein power of the unit barriers having the same order in respective pitches of the 3D image filter is commonly controlled.

7. The method according to claim 3, wherein the number of the unit barriers, power applied to which is converted, is proportional to a displacement of the non-transmissive region.

8. The method according to claim 3, wherein the unit barriers neighbor each other when power of a plurality of the unit barriers within the non-transmissive region is converted.

9. An apparatus of displaying a 3-Dimensional (3D) image, the apparatus comprising:
    a camera unit configured to capture images of a viewer;
    a position tracking device configured to detect a current position and a previous position of the viewer using a video frame included in the captured images, calculate a movement speed of the viewer using the detected current position and the previous position of the viewer, estimate a position of the viewer after a predetermined time using the detected current position of the viewer and the calculated movement speed of the viewer, calculate positions of a non-transmissive region of a 3D image filter based on the detected current position of the viewer and the estimated position of the viewer and calculate a displacement of the non-transmissive region of the 3D image filter based on the calculated positions; and
    a display unit configured to move the non-transmissive region of the 3D image filter according to the calculated displacement of the non-transmissive region,
    wherein a liquid crystal lens constitute a pitch by being separated by a single transmissive region and a single non-transmissive region causing the moving of the non-transmissive region, and
    wherein movement of the liquid crystal lens depend on adjusting voltage applied respectively to a predetermined number of unit electrodes that are moved by a number of unit electrodes having a length equal to a given displacement.

10. The apparatus according to claim 9, wherein a pitch of the 3D image filter includes a plurality of unit barriers.

11. The apparatus according to claim 10, wherein the display unit moves the non-transmissive region by converting power of at least one of the plurality of unit barriers.

12. The apparatus according to claim 10, wherein the display unit moves the non-transmissive region by converting power of at least one unit barrier located in one side of the non-transmissive region and of at least one of unit barriers included in a transmissive region next to the other side of the non-transmissive region.

13. The apparatus according to claim 10, wherein the display unit commonly controls power of the unit barriers having the same order in respective pitches of the 3D image filter.

14. The apparatus according to claim 11, wherein the number of the unit barriers, power applied to which is converted, is proportional to a displacement of the non-transmissive region.

15. The apparatus according to claim 11, wherein the unit barriers neighbor each other when power of a plurality of the unit barriers within the non-transmissive region is converted.

* * * * *